(12) United States Patent
Shimmei et al.

(10) Patent No.: US 6,820,333 B2
(45) Date of Patent: Nov. 23, 2004

(54) METHOD OF CONVERTING STORAGE PUMPS INTO REVERSIBLE PUMP-TURBINES

(75) Inventors: Katsumasa Shimmei, Tokyo (JP); Kazuo Niikura, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/395,288

(22) Filed: Mar. 25, 2003

(65) Prior Publication Data

US 2003/0182798 A1 Oct. 2, 2003

(30) Foreign Application Priority Data

Mar. 27, 2002 (JP) .................................. 2002-087354

(51) Int. Cl.$^7$ .............................................. B23P 15/00
(52) U.S. Cl. ............................. 29/880.011; 29/401.1; 29/889.1
(58) Field of Search ........................ 29/889.2, 889.1, 29/888.021, 401.1; 415/129, 140, 198.1, 208.2; 290/52

(56) References Cited

U.S. PATENT DOCUMENTS 4,217,077 A * 8/1980 Brcar ........................... 417/407
4,275,989 A * 6/1981 Gutierrez Atencio ....... 415/129
4,496,282 A * 1/1985 Gokhman .................... 415/161

FOREIGN PATENT DOCUMENTS

| GB | 2145165 | * | 3/1985 |
| JP | 5-155656 | * | 6/1993 |
| JP | 11-343955 | | 12/1999 |
| JP | 2000-205101 | | 7/2000 |

* cited by examiner

Primary Examiner—Irene Rosenbaum
(74) Attorney, Agent, or Firm—Crowell & Moring LLP

(57) ABSTRACT

An existing water-lifting pump is converted into a reversible pump-turbine which functions as not only a water-lifting pump, but also a pump-turbine capable of generating electric power. An existing pump runner is modified or replaced with a replacement runner. Movable guide vanes are disposed, or the rotational speed of the runner is increased. Alternatively, water passages in the stationary parts are modified. A pumping station can be given with the function as an urgent power plant in the event of an electric power shortage. A converted pump-turbine having good pump-turbine characteristics can be economically obtained.

9 Claims, 13 Drawing Sheets

Prior Art

II — II

METHOD OF CONVERTING STORAGE PUMPS INTO REVERSIBLE PUMP-TURBINES

BACKGROUND OF THE INVENTION

1. Field of the Invention

The present invention relates to a method of converting storage pumps into reversible pump-turbines.

2. Description of the Related Art

Pumps are used to pump up water from a low position to a high position. Such a pump has an impeller runner, which is rotated by an electric motor, thereby pumping up water. On the other hand, in places where there is a demand for pumping-up of water, it is also demanded to drop water from a high position to a low position in many cases. In those cases, water is generally naturally dropped by gravity while bypassing the pump. In that connection, there has arisen a demand for more effective utilization of energy through power generation utilizing the head. This demand means that the pump is rotated in the reversed direction to serve as a power generator.

It is sure that an impeller runner rotated to function as a pump can be rotated in the reversed direction. However, because the impeller runner is not originally designed on the premise that it serves also as a pump-turbine, the impeller runner has poor performance when it is employed as a turbine, and satisfactory power generation cannot be essentially achieved.

SUMMARY OF THE INVENTION

In view of the state of the art set forth above, it is an object of the present invention to provide a method of converting storage pumps into reversible pump-turbines, which can perform effective power generation.

To achieve the above object, the present invention provides a method of converting a storage pump into a reversible pump-turbine, the method comprising the steps of dismounting, from the storage pump which pumps up water to a water conduit by rotating an impeller runner in a scroll case with a rotary electric machine, said impeller runner; replacing or adapting the impeller runner with or to a runner having a smaller outer diameter than said impeller runner; providing vanes in positions closer to the scroll case side than a position where the replaced or adapted runner is disposed; and modifying the rotary electric machine or rotation control thereof such that a rotational speed of the replaced or adapted runner is increased from a rotational speed before the replacement or adaptation, when the replaced or adapted runner is rotated for power generation based on the head of the water conduit.

Also, the present invention provides a method of converting a storage pump into a reversible pump-turbine, the method comprising the steps of dismounting, from the storage pump which pumps up water to a water conduit by rotating an impeller runner surrounded by a head cover and a bottom cover in a scroll case under control with a rotary electric machine, the head cover or the bottom cover; and adapting at least a portion of the impeller runner near an outer periphery thereof such that an angle of the portion measured relative to a circumferential direction is reduced.

According the present invention thus constructed, storage pumps can be converted into reversible pump-turbines capable of being satisfactorily put into practical use.

DESCRIPTION OF THE PREFERRED EMBODIMENTS

Preferred embodiments of the present invention will be described below with reference to the drawings.

Figure 1:
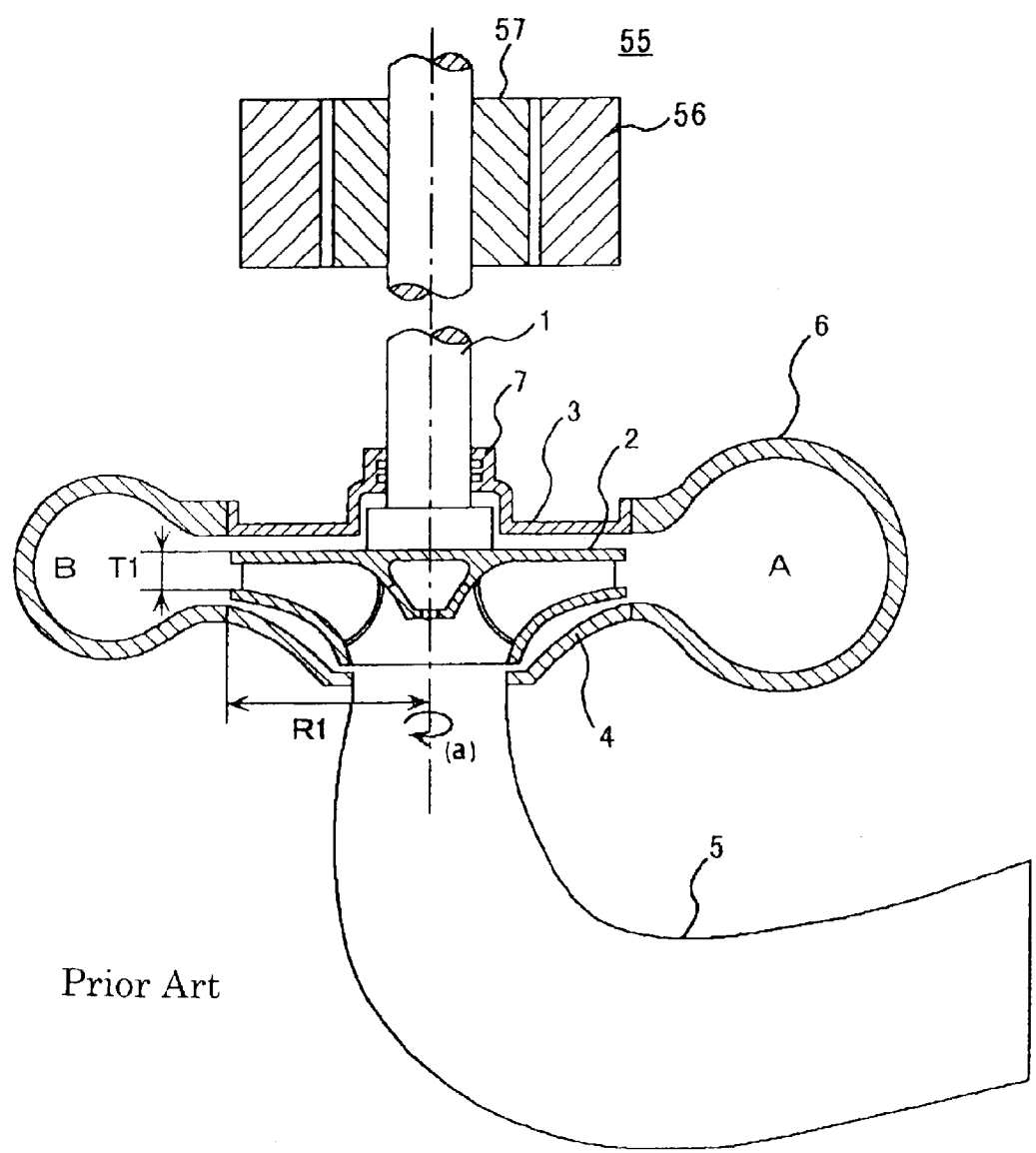
FIG. 1 is a sectional view showing a storage pump before being converted into a reversible pump-turbine according to a first embodiment.
Figure 2:
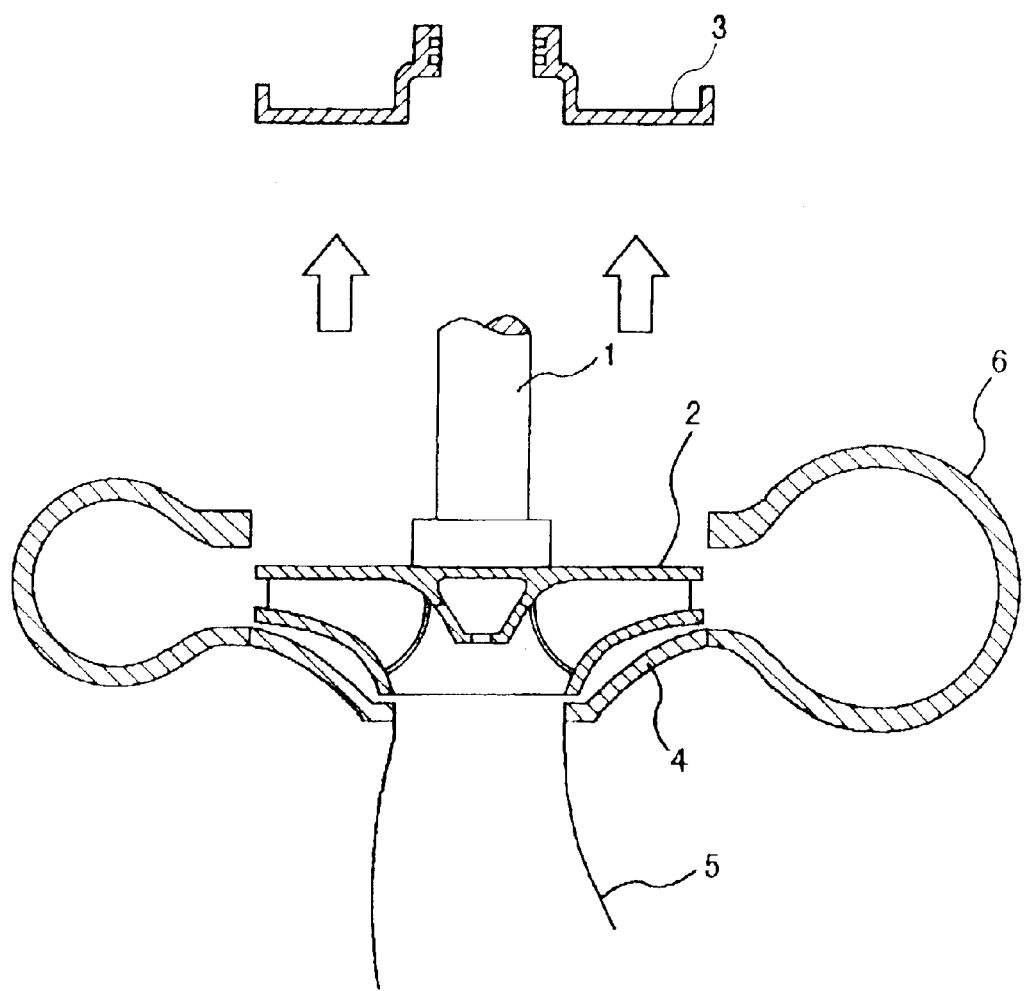
FIG. 2 is a sectional view for explaining a step of dismounting a head cover according to the first embodiment.
Figure 3:
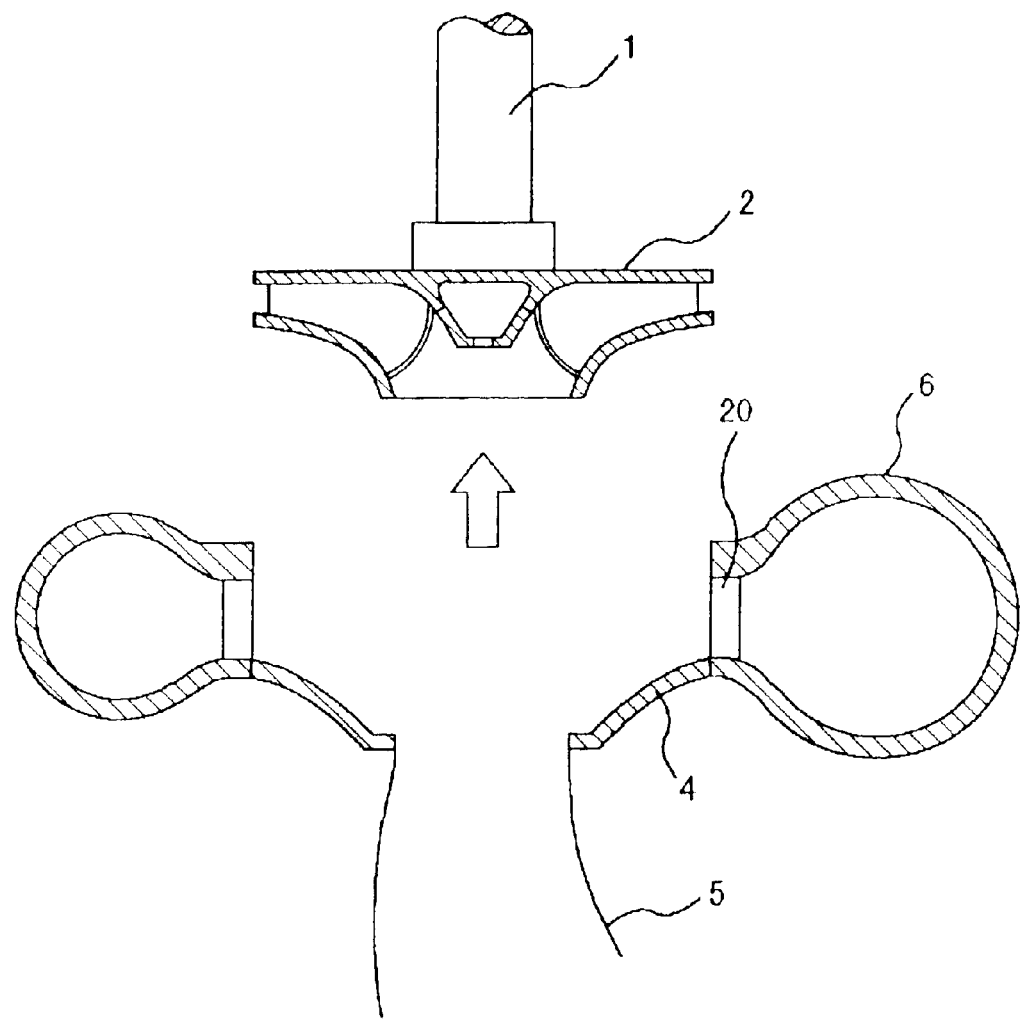
FIG. 3 is a sectional view for explaining a step of dismounting a runner according to the first embodiment.
Figure 4:
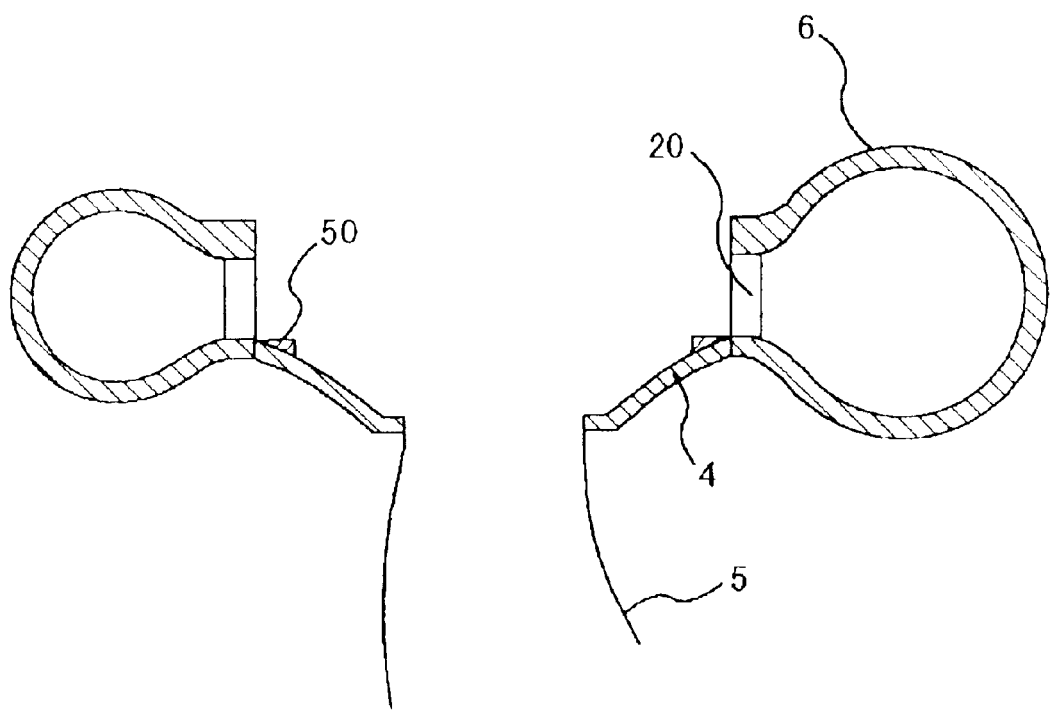
FIG. 4 is a sectional view showing a step of processing a bottom cover according to the first embodiment.

FIG. 1 shows a general storage pump. Embodiments described below are intended to convert storage pumps into pump-turbines. Although respective components of a storage pump and a pump-turbine, which have the same functions, are usually called by different names, the names used in the pump-turbine are employed in the following description. Referring to FIG. 1, a runner 2 is co-axially connected to a shaft 1. A head cover 3 and a bottom cover 4 are disposed respectively above and below the runner 2. The head cover 3 and the bottom cover 4 are each in the doughnut-like form, and the shaft 1 is projected out of the head cover 3 through a seal (watertight ring) 7. On the other hand, a draft tube 5 is connected to the bottom cover 4. An area surrounded by the head cover 3 and the bottom cover 4 is covered with a scroll case 6 disposed so as to lie in a perpendicular relation to the shaft 1. A rotary electric machine (electric motor) 55 is provided over an upper portion of the shaft 1. The rotary electric machine 55 comprises a stator 56 and a rotor 57.

In the storage pump thus constructed, when a current is supplied to the rotor 57 of the rotary electric machine 55, a torque is generated between the stator 56 and the rotor 57, and the generated torque is transmitted to the runner 2 through the shaft 1, whereupon the runner 2 is rotated in a rotating direction (a) shown in FIG. 1. Accordingly, water in the runner 2 is subjected to radial forces because of centrifugal forces caused with the rotation of the runner. In other words, the runner 2 sucks water in the draft tube 5 and presses the sucked water against the scroll case 6. Then, water in the scroll case 6 is pushed from a zone B to reach a zone A after passing a case portion positioned behind the drawing sheet, so that the water is pumped up to a higher position.

A practical example for converting storage pumps into reversible pump-turbines according to a first embodiment will now be described with reference to FIGS. 2 to 7. In a step shown in FIG. 2, the head cover 3 is dismounted by lifting it up. Note that, while the head cover 3 is dismounted for replacement of the runner 2 in the first embodiment shown in FIGS. 2 to 7, the bottom cover 4 may be dismounted for replacement of the runner 2. In a step shown in FIG. 3, the runner 2 is dismounted together with the shaft 1 by lifting them up. Then, stay vanes 20 are fixed by, e.g., welding to a fore end (or near a fore end) of the scroll case 6 on the suction side thereof (discharge side in the case of the storage pump). The stay vanes 20 are constituted by arranging a plurality of vanes co-axially with the shaft 1 in an equally spaced relation. In a step shown in FIG. 4, an additional ring 50 is fixed by, e.g., welding to a portion of the bottom cover 4 close to the scroll case 6. The additional ring 50 has an outer diameter set such that its outer periphery substantially contacts with a suction of the scroll case 6 (discharge in the case of the storage pump). An inner diameter of the additional ring 50 is set such that its inner periphery is positioned close to an outer periphery of a replacement runner 21 described later.

Figure 5:
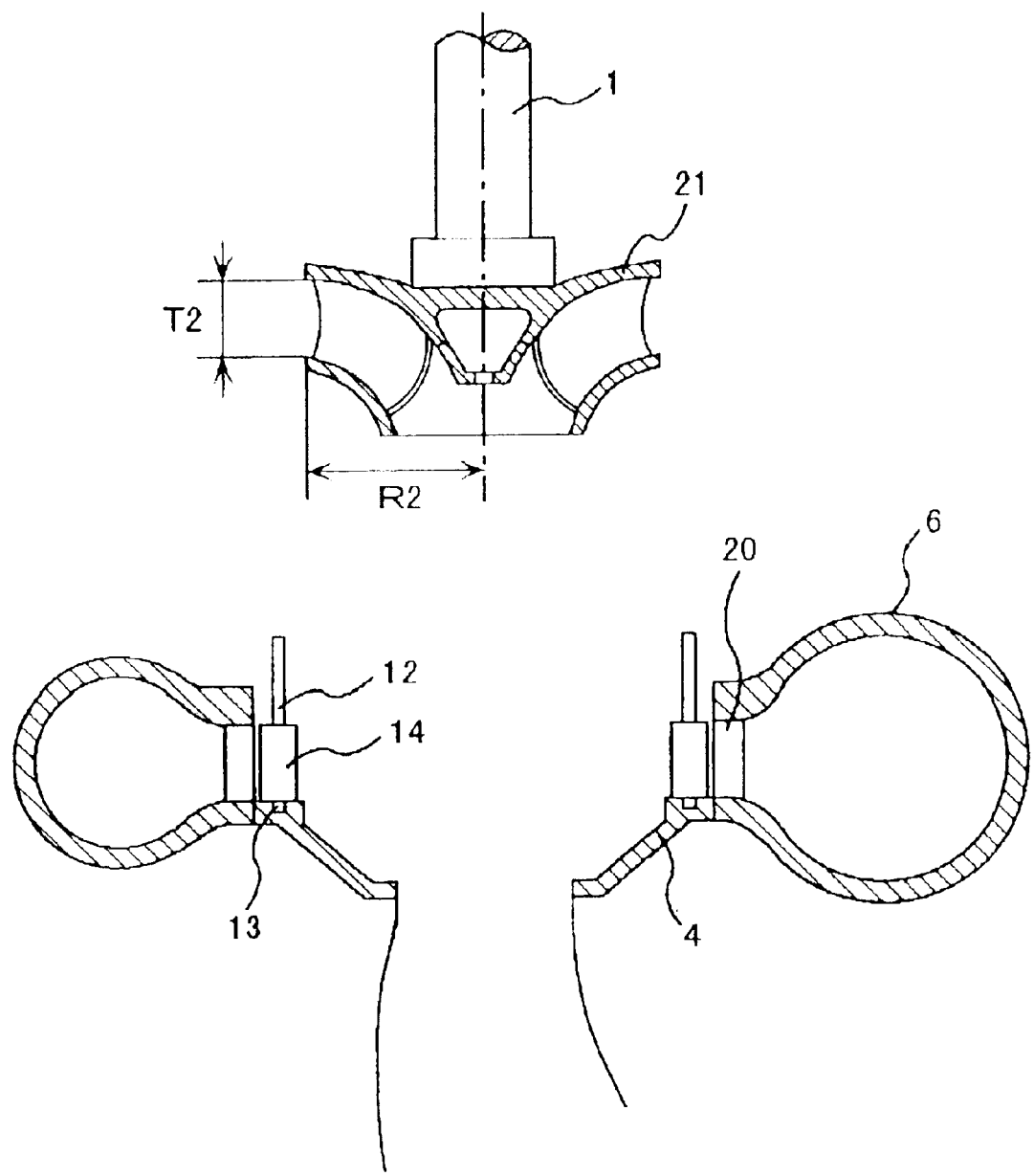
FIG. 5 is a sectional view showing a step of assembling a replacement runner and stay vanes according to the first embodiment.

In a step shown in FIG. 5, shaft holes 13 are formed by, e.g., drilling so as to penetrate the additional ring 50 and partly extend into the bottom cover 4. Shafts 12 are inserted in the shaft holes 13, respectively. Guide vanes 14 are fixed to the shafts 12, respectively, for rotation with the shafts 12. The guide vanes 14 are constituted by arranging a plurality of vanes co-axially with the shaft 1 in an equally spaced relation. Each of the guide vanes 14 is driven by a servo motor (described later) to change a vane angle for adjustment of the flow rate of water supplied to the replacement runner 21. Then, the replacement runner 21 is fixed to the shaft 1, and this assembly is mounted in place by lowering it until reaching a position close to the bottom cover 4. Comparing with an outer diameter R1 and a suction size T1 of the runner 2 shown in FIG. 1, the replacement runner 21 has a suction size T2 greater than the suction size T1 of the runner 2 (referred to also as a pump runner) which functions as a storage pump. Further, an outer diameter R2 of the replacement runner 21 is set smaller than the outer diameter R1 of the pump runner 2.

Figure 6:
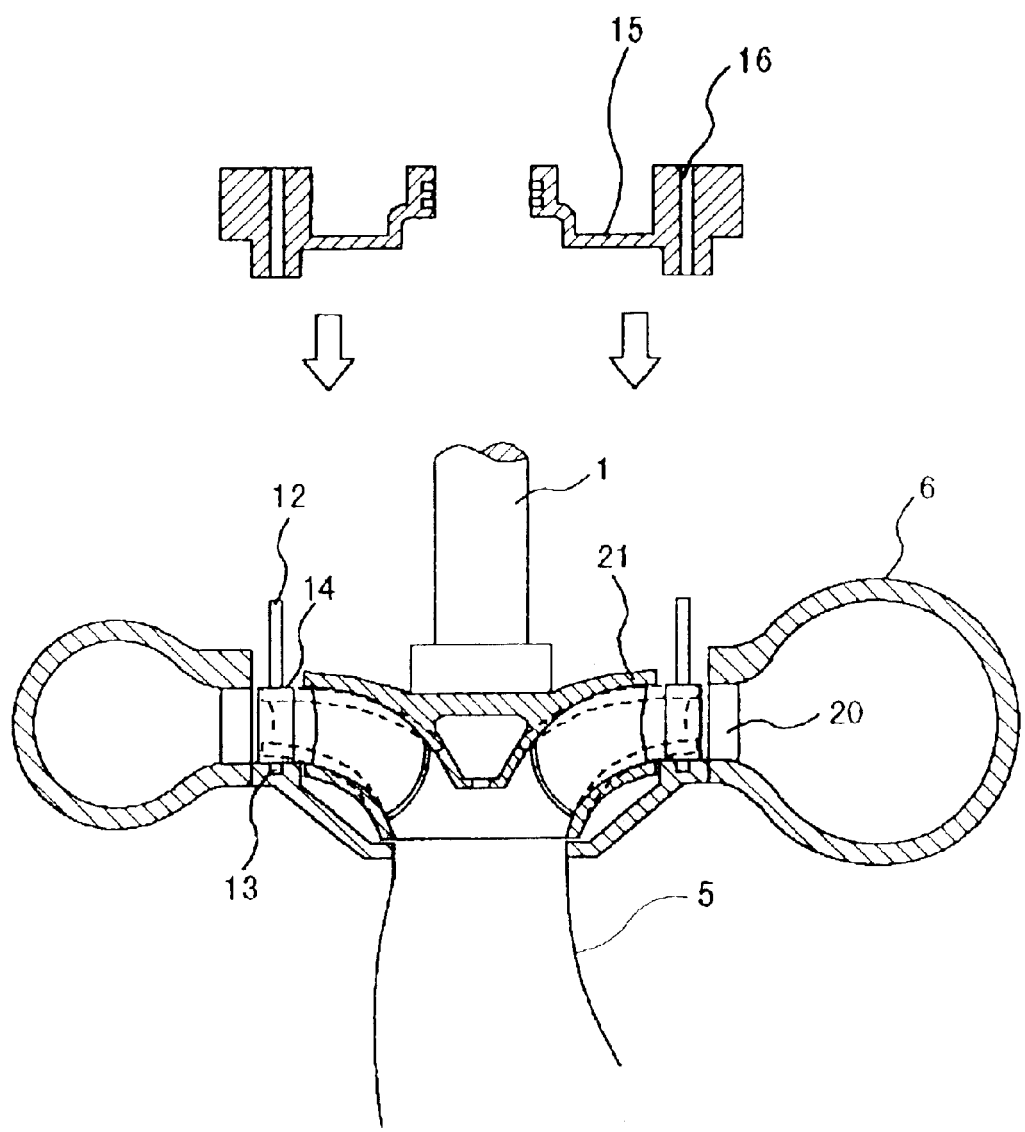
FIG. 6 is a sectional view showing a step of assembling guide vanes and a head cover according to the first embodiment.

In a step shown in FIG. 6, a replacement head cover 15 is mounted by lowering it such that the shafts 12 of the guide vanes 14 are inserted in through holes 16 penetrating the replacement head cover 15. Also, the shafts 12 of the guide vanes 14 are each coupled to the servo motor (not shown) through a gate operating ring. When the serve motor (not shown) is driven, each guide vane 14 is set through the gate operating ring (not shown) for introducing a water flow to the replacement runner 21 at the same vane angle.

Figure 7:
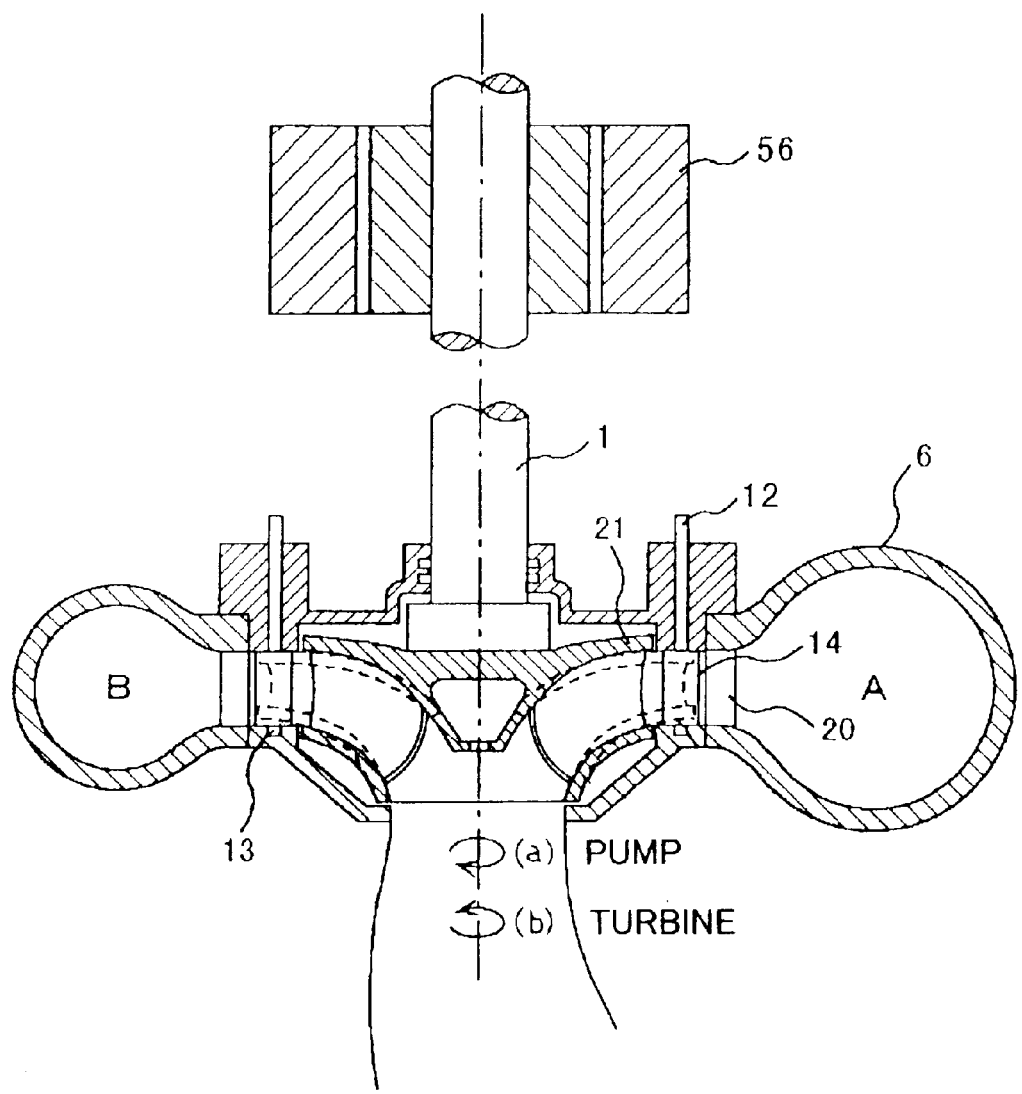
FIG. 7 is a sectional view of a converted pump-turbine according to the first embodiment.

FIG. 7 shows a converted pump-turbine obtained through modifying steps of replacing the pump runner 2 with the replacement runner 21, newly adding the movable guide vanes 14, and newly adding the stay vanes 20. Though not specifically shown, the electric motor 55 connected to the pump runner 2 is replaced with a replacement motor-generator designed so as to rotate at a higher rotational speed. The vane outer diameter of the replacement runner 21 is set smaller than that of the existing runner 2 (or the replacement runner 21), which is indicated by dotted lines, to such an extent as allowing the guide vanes 14 to be disposed.

The rotational speed (N) of the replacement motor-generator 56 is set to a higher value in inverse proportion to a reduction rate of the vane outer diameter (D) of the replacement runner 21. Generally, the efficiency of the pump-turbine is maintained satisfactorily when the peripheral speed coefficient of the runner K, expressed by the following formula, is held constant:

$$K = \frac{\frac{\Pi}{60}ND}{\sqrt{2gH}}$$

Hence, the rotational speed (N) is increased corresponding to a reduction of the vane outer diameter (D) based on the above formula. As a result, the peripheral speed coefficient K of the replacement runner 21 at its vane outer periphery is set to a value substantially equal to that in the existing runner, and the pump performance can be maintained at a level substantially equal to that in the existing runner. Further, the runner inlet height H is set larger than that in the existing runner in match with the width of a water passage of an existing stay ring. This setting is effective in suppressing flow turbulence near the wall. The guide vanes 14 are arranged co-axially with an axis of the replacement head cover 15, i.e.; the shaft 1, in an equally spaced relation and are driven by the servo motor (not shown) through a link-lever mechanism (not shown). When the guide vanes 14 are closed, they are positioned close to each other in a nearly contact relation. On the other hand, when the guide vanes 14 are opened, they are positioned away from each other to form gaps for passage of water therebetween. The stay vanes 20 are each arranged obliquely with respect to the radial direction, i.e., substantially in the same direction as the guide vanes 14.

Figure 8:
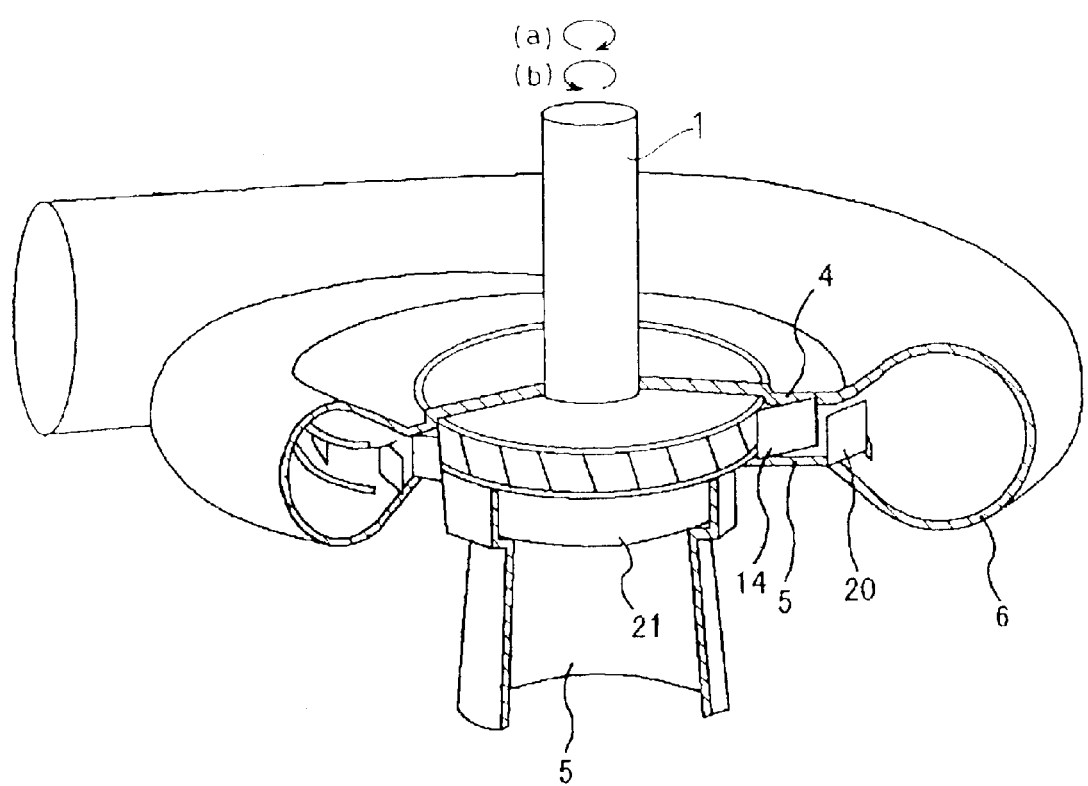
FIG. 8 is an overall view, partly broken, of the converted pump-turbine according to the first embodiment.

Referring to FIGS. 7 and 8, during turbine operation (represented by an arrow (b)), water is introduced to the scroll case 6 from a penstock (not shown), and flows in the scroll case 6 from the zone A in a direction toward a case portion positioned behind the drawing sheet. Then, the water is introduced to and baffled by the stay vanes 20. While swirling in such a way, the flow rate of the water is regulated by the guide vanes 14. Further, the water flow strikes against the replacement runner 21, whereupon the replacement runner 21 is rotated to generate a torque or power. Downstream of the replacement runner 21, the water is introduced from the draft tube 5 to a tailrace tunnel while being decelerated. During pump operation (represented by an arrow (a)), the replacement runner 21 is rotated in a direction reversal to that during the turbine operation, and water flows in the reversed direction. The water introduced from the draft tube 5 is given with forces upon the rotation of the replacement runner 21, and then flows into the scroll case 6 through the guide vanes 14 and the stay vanes 20. Thus, the water is pumped up through the penstock.

Figure 9A:
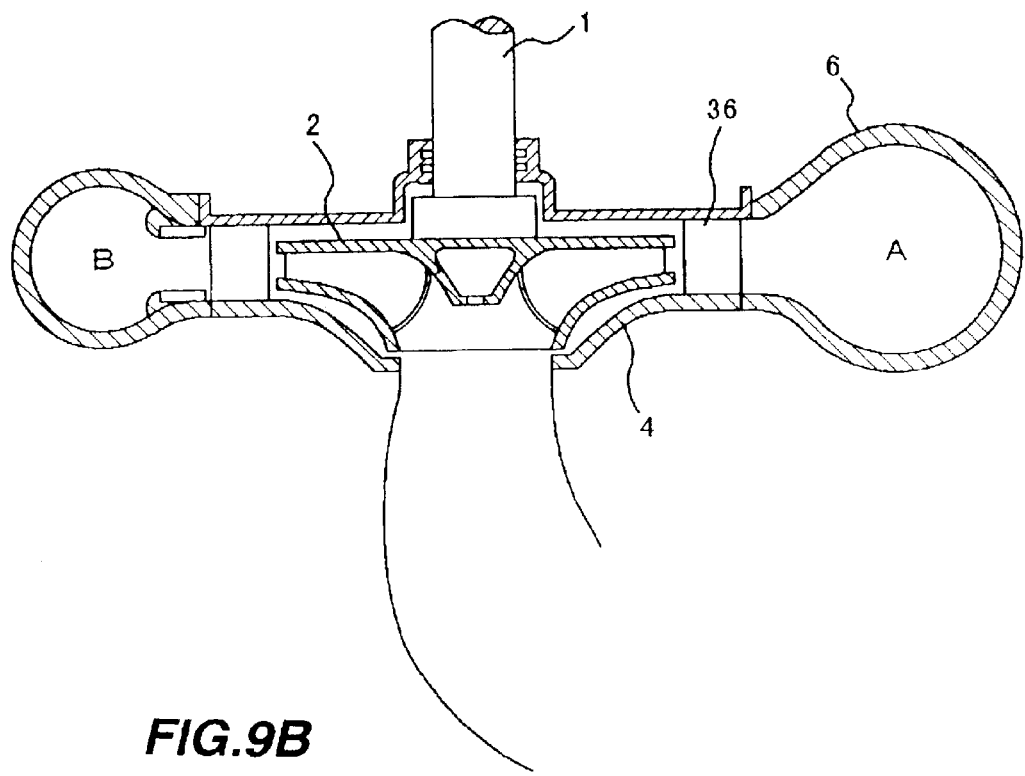
FIGS. 9A, 9B and 9C are sectional views of an adapted pump-turbine according to a second embodiment.
Figure 9B:
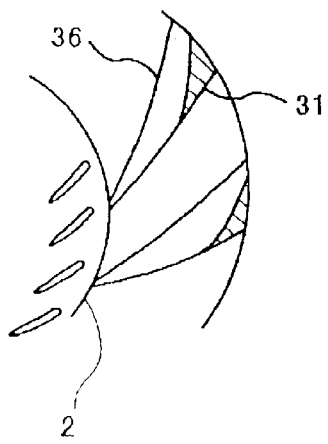
Figure 9C:
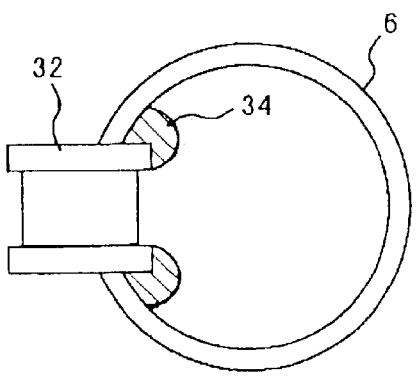

Next, a second embodiment will be described with reference to FIGS. 9A to 9C. This second embodiment is premised on that, as shown in FIG. 9A, stay vanes (diffuser vanes) 36 are already present in an existing pump. Such an existing pump is adapted into a pump-turbine. Note that similar parts in FIGS. 9A to 9C to those in the first embodiment are denoted by the same reference numerals. In the second embodiment, a vane angle of outer peripheral portions of the stay vanes (diffuser vanes) 36 is adapted such that those outer peripheral portions are oriented closer to the circumferential direction. To that end, as shown in FIG. 9B, a hatched portion 31 of each vane 36 is cut away. And as showing FIG. 9C, at joints between a stay ring 32 and the scroll case 6, bell mouths 34 are formed by welding for smoothly introducing the water flow during the turbine operation. Further, a replacement motor-generator substituted for an electric rotary machine (not shown), which has been originally coupled to the shaft 1, is constituted as an adjustable unit so that the head variation range during the pump operation is increased and input adjustment can be performed. In addition, by setting the rotational speed to a lower value during the turbine operation, it is possible to enlarge the net head range during the turbine operation and to reduce vibrations at low heads and at partial loads.

With this second embodiment, since the existing storage pump can be adapted to a substantially complete pump-turbine by employing the existing scroll case 6 as it is, a turbomachinery can be obtained which has pump performance comparable to that of the existing unit and also has turbine performance comparable to that of the pump.

Figure 10:
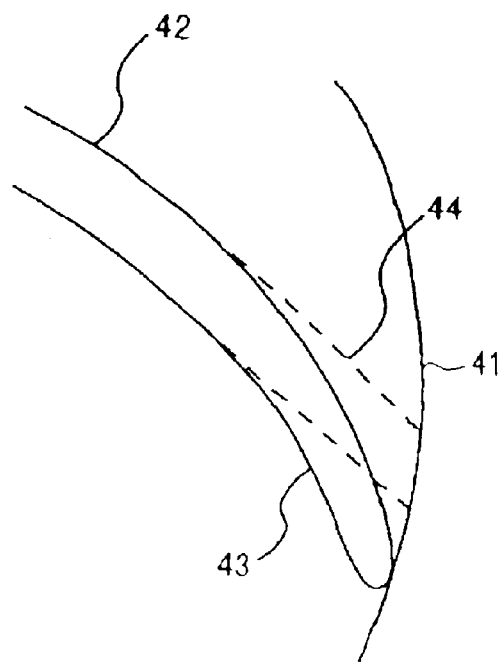
FIG. 10 is a schematic view showing the second embodiment.

A third embodiment will be described below with reference to FIG. 10. This third embodiment is premised on the presence of an existing stay ring, and is primarily intended to add guide vanes in addition to replacement of the existing pump runner 2. In FIG. 10, a replacement runner 41 has a vane outer diameter substantially equal to that of the existing pump runner 2. As indicated by solid lines 43 in FIG. 10, however, the angles of vanes 42 at each outer peripheral portion of the replacement runner is adapted such that the outer peripheral portion is oriented closer to the circumferential direction (dotted lines 44 represent a vane angle of the existing pump runner). Also, the rotational speed of a replacement motor-generator (not shown) is set to the same value as that of the existing unit. Therefore, the existing electric motor can also be employed by adding only a phase reversing disconnect switch to it. The runner inlet height of the replacement runner 41 is set larger than that in the existing pump runner in match with the width of a water passage of the existing stay ring. This setting is effective in suppressing flow turbulence near the wall. The guide vanes are arranged, by way of example, similarly to the first embodiment as shown in FIG. 7, such that the guide vanes are accommodated in a space defined by the existing stay ring. The number of the guide vanes is set depending on the size of that space. In other words, the number of the guide vanes is set to a larger value when the space size is small, and to a smaller value when the space size is large. The guide vanes 14 (refer to FIG. 7) have respective shafts penetrating the existing stay ring, are arranged above the stay ring co-axially with its axis in an equally spaced relation, and are driven by a servo motor through a link-lever mechanism.

With this third embodiment, since the storage pump can be converted into the pump-turbine without changing the rotational speed, the conversion into the pump-turbine can be realized without impairing the pump performance even when the existing unit has a shallow submergence. Also, since the existing electric motor is not required to be replaced with the specific motor-generator, the economic efficiency is improved. Moreover, the pump-turbine is achieved which can regulate a turbine output with adjustment of the movable guide vanes, and can provide good efficiency and vibration characteristics during the turbine operation.

Figure 11:
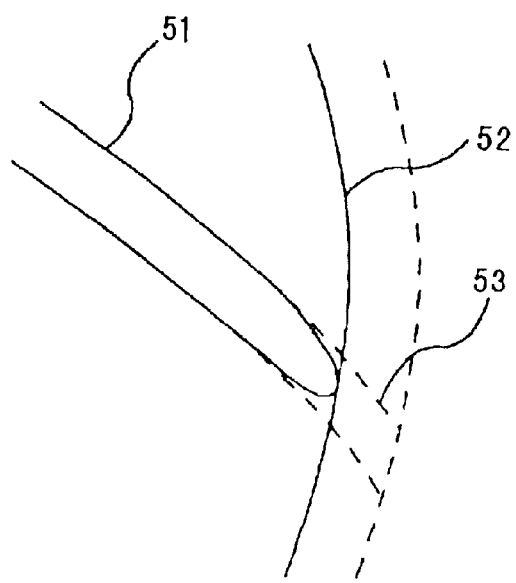
FIG. 11 is a schematic view showing a third embodiment.

FIG. 11 shows a fourth embodiment. This fourth embodiment is basically the same as the third embodiment except that the replacement runner has a different shape.

In FIG. 11, a replacement runner may be designed and fabricated as a new pump-turbine runner similarly to the third embodiment, or may be an adapted runner obtained by reshaping vane outlet portions of the existing pump runner 2. The adaptation can be realized by a method of modifying the shape of each vane outlet portion so as to incline closer to the circumferential direction as shown in FIG. 10, or to have a smaller diameter. Alternatively, as shown in FIG. 11, an existing runner vane 51 may be employed as it is, but in the form resulted from cutting away a distal end portion 53 of the vane to provide a smaller vane diameter 52. In this fourth embodiment, guide vanes 14 (refer to FIG. 7) may be fixedly disposed in a space defined by the existing stay ring. The fixed guide vanes are each arranged obliquely with respect to the radial direction. When diffuser vanes are already disposed, they may be used as the fixed guide vanes after reshaping turbine inlets smoothly. Because of the fixed guide vanes being used, the turbine output is adjusted using a turbine shut-off valve.

With this fourth embodiment, the storage pump can be converted into the pump-turbine at the lowest expense. In other words, the power generating function for urgent purpose can be provided in the pumping station at a minimum cost.

Figure 12:
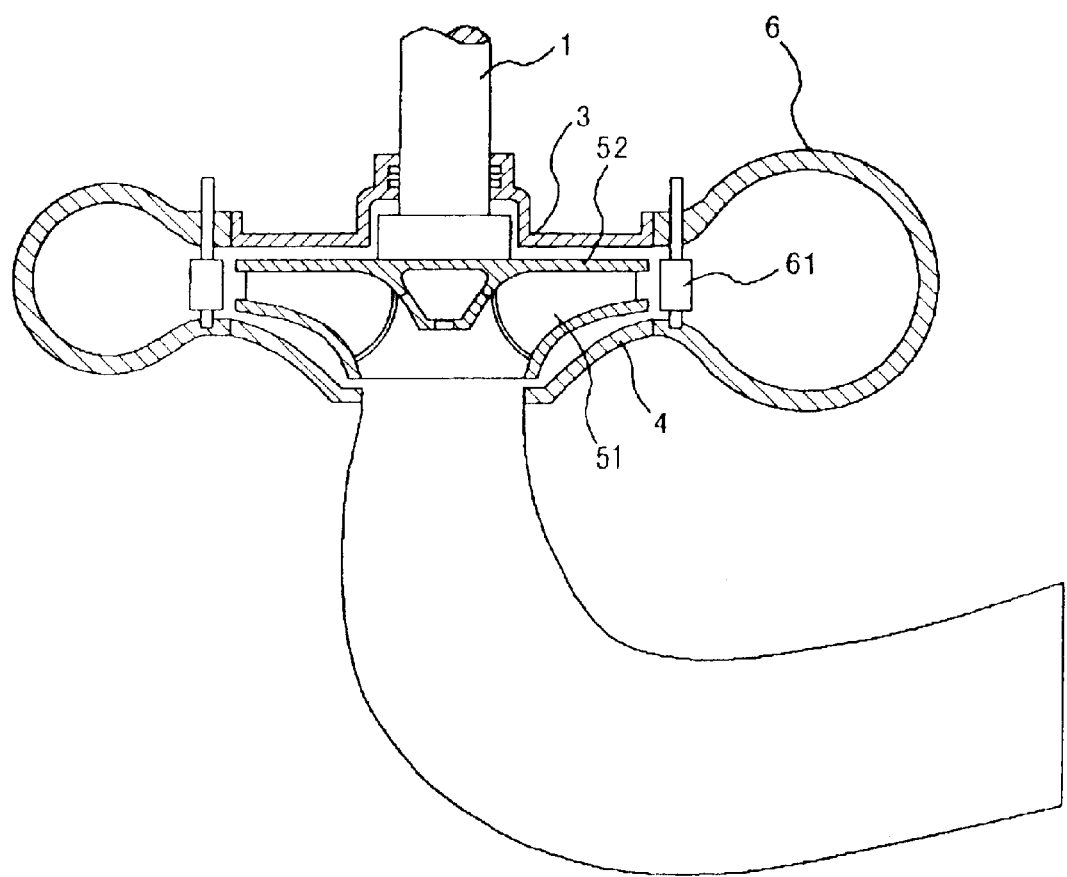
FIG. 12 is a sectional view showing a fourth embodiment.

FIG. 12 shows a fifth embodiment. In this fifth embodiment, guide vanes 61 are disposed in the scroll case 6.

Figure 13:
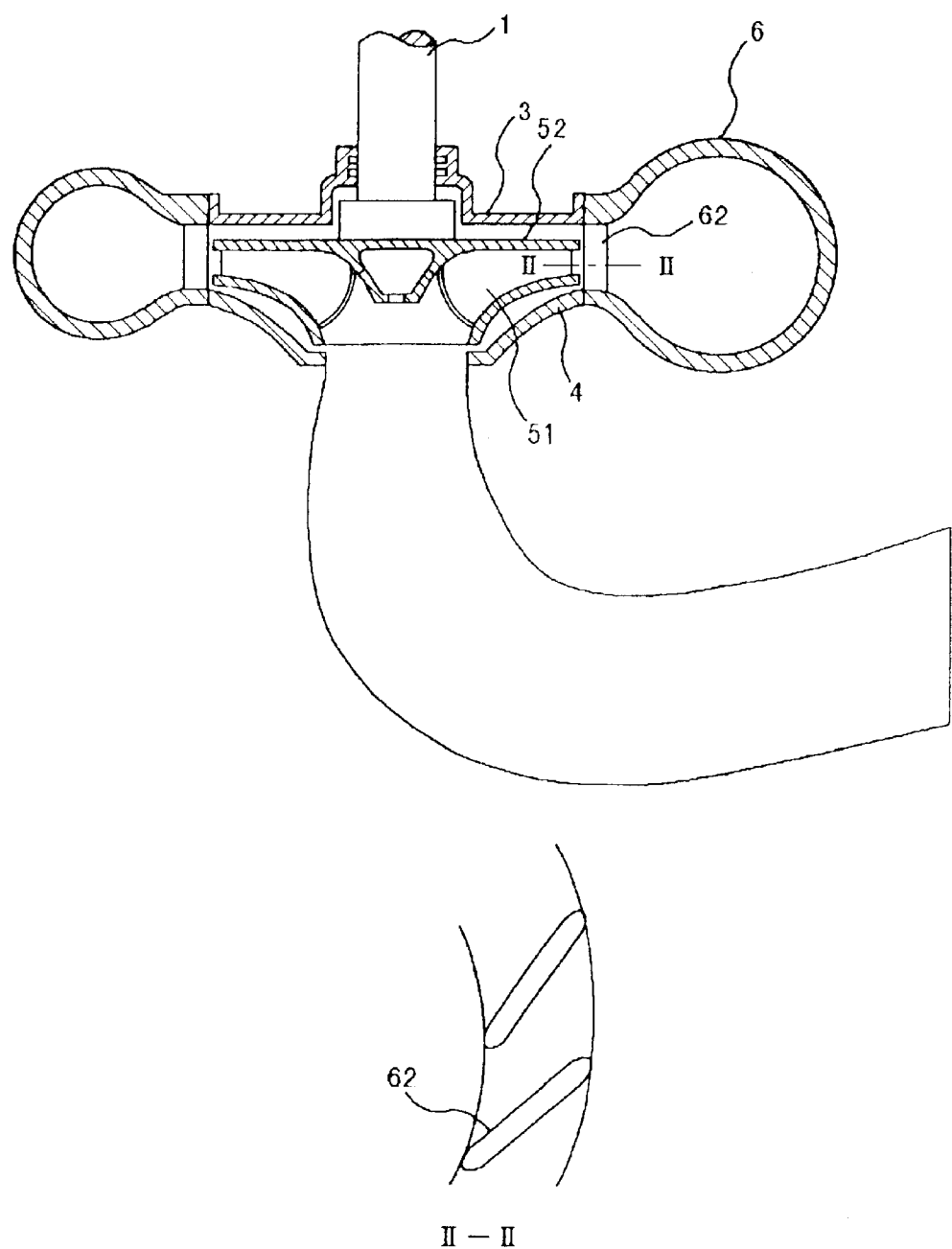
FIG. 13 is a sectional view showing the fourth embodiment.
Figure 14:
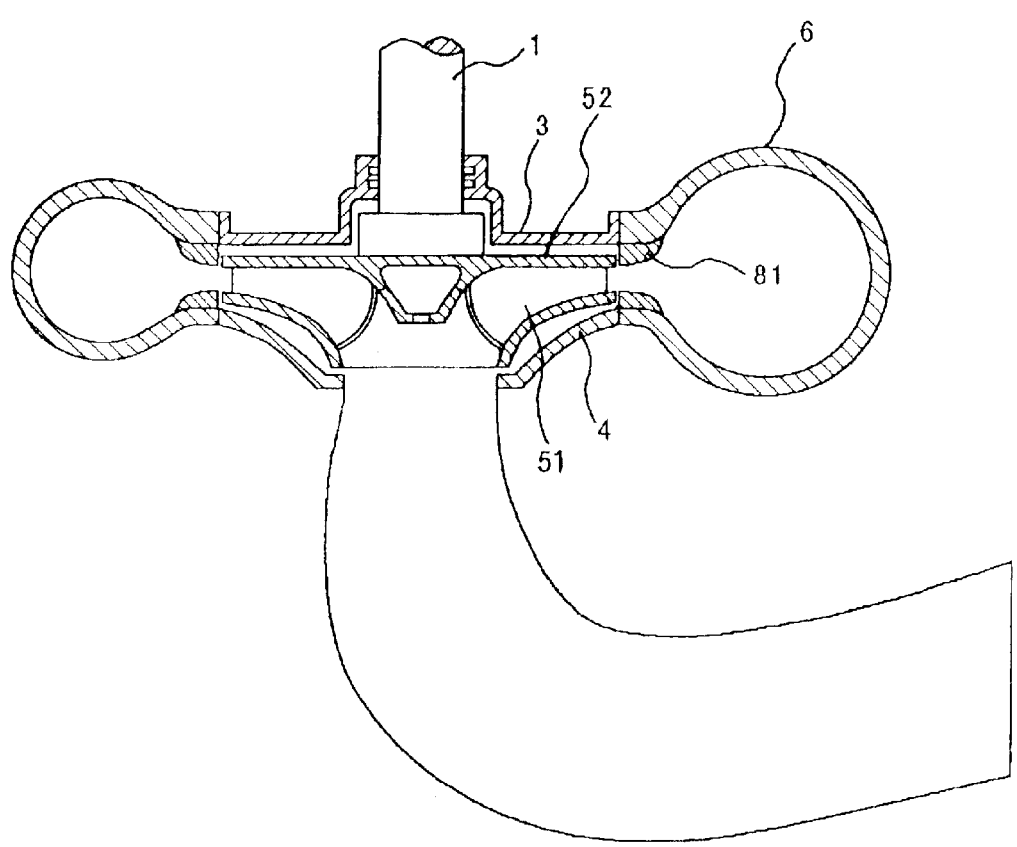
FIG. 14 is a sectional view showing a fifth embodiment.

Next, FIG. 13 shows a sixth embodiment. In this sixth embodiment, stay vanes 62 are disposed in the scroll case 6. FIG. 14 shows a seventh embodiment. In this seventh embodiment, bell mouths 81 are provided in the scroll case 6. Note that, in the fifth to seventh embodiments, similar parts to those in the other embodiments are denoted by the same reference numerals, and a description of those parts is omitted here.

As described above, since an existing storage pump can be converted into a pump-turbine, even a turbomachinery, which is usually operated as a water lifting pump, can be operated as a turbine as the occasion requires, whereby electric power can be produced with the power generating function of the pump-turbine. Thus, the pumping station can also develop the function as an urgent power plant in the event of an electric power shortage, and more effective utilization of energy can be realized with power generation using surplus water.

Also, since an existing storage pump can be converted into a pump-turbine having good efficiency and vibration characteristics during the power generating operation, it is possible not only to achieve more economic power generating operation, but also to reduce the necessity of maintenance of the pump-turbine because of reduced vibrations.

Further, when modifying the storage pump, there is no need of replacing the existing scroll case. Accordingly, even when the existing scroll case is embedded in the concrete and its replacement is practically impossible, such an existing storage pump can also be converted into a pump-turbine. In addition, since the existing scroll case is not replaced, more economical conversion into the pump-turbine can be realized.

What is claimed is:

1. A method of converting a storage pump into a reversible pump-turbine, the method comprising the steps of:

dismounting, from said storage pump which pumps up water to a water conduit by rotating an impeller runner in a scroll case with a rotary electric machine, said impeller runner;

replacing or adapting said impeller runner with or to a runner having a smaller outer diameter than said impeller runner;

providing vanes in positions closer to the scroll case side than a position where the replaced or adapted runner is disposed; and modifying said rotary electric machine or rotation control thereof such that a rotational speed of the replaced or adapted runner is increased from a rotational speed before the replacement or adaptation, when the replaced or adapted runner is rotated for power generation based on the head of said water conduit.

2. A method of converting a storage pump into a reversible pump-turbine according to claim 1, further comprising a step of reshaping an outer peripheral portion of a vane of said impeller runner such that an angle of said vane measured relative to a circumferential direction is reduced.

3. A method of converting a storage pump into a reversible pump-turbine according to claim 1, further comprising a step of reshaping an outer peripheral portion of a vane of said impeller runner such that an outer diameter of said vane is reduced.

4. A method of converting a storage pump into a reversible pump-turbine, the method comprising the steps of:

dismounting, from a said storage pump which pumps up water to a water conduit by rotating an impeller runner surrounded by a head cover and a bottom cover in a scroll case under control with a rotary electric machine, said head cover or said bottom cover;

adapting at least a portion of said impeller runner near an outer periphery thereof such that an angle of said portion measured relative to a circumferential direction is reduced; and mounting a replacement cover, or remounting said head cover or said bottom cover, to said storage pump.

5. A method of converting a storage pump into a reversible pump-turbine according to claim 1 or 4, wherein an outer peripheral portion of the replaced or adapted runner has a height of a water passage in match with a height of a parallel portion of a scroll water passage.

6. A method of converting a storage pump into a reversible pump-turbine according to claim 1 or 4, further comprising a step of providing, as a motor-generator, an adjustable speed motor-generator.

7. A method of converting a storage pump into a reversible pump-turbine according to claim 1 or 4, further comprising steps of providing a scroll water passage having a parallel portion, and disposing a distant piece to make a width of the parallel portion of said scroll water passage in match with a width of a water passage at an outer peripheral portion of the replaced runner.

8. A method of converting a storage pump into a reversible pump-turbine according to claim 4, further comprising a step of providing, as said rotary electric machine, a motor-generator added with a phase reversing disconnect switch.

9. A method of converting a storage pump into a reversible pump-turbine, the method comprising the steps of:

dismounting, from a storage pump which pumps up water to a water conduit by rotating an impeller runner surrounded by a head cover and a bottom cover in a scroll case under control with a rotary electric machine, said head cover or said bottom cover;

providing fixed or movable vanes in said scroll case outside said impeller runner co-axially with a rotary shaft of said impeller runner at predetermined intervals; and mounting a replacement cover, or remounting said head cover or said bottom cover, to said storage pump.

* * * * *